(12) United States Patent
Sakakura

(10) Patent No.: US 8,277,982 B2
(45) Date of Patent: Oct. 2, 2012

(54) METHOD FOR IMPROVEMENT OF THE CONSUMPTION CONTROLLING PERFORMANCE OF WATER-SOLUBLE ELECTROLYTE CHEMICAL CELLS AND FUEL CELLS

(76) Inventor: Yasuo Sakakura, Saitama (JP)

( * ) Notice: Subject to any disclaimer, the term of this patent is extended or adjusted under 35 U.S.C. 154(b) by 1289 days.

(21) Appl. No.: 11/427,452

(22) Filed: Jun. 29, 2006

(65) Prior Publication Data

US 2008/0003488 A1    Jan. 3, 2008

(51) Int. Cl.
*H01M 8/00*     (2006.01)
*H01M 10/44*   (2006.01)

(52) U.S. Cl. .......................................... 429/400; 429/50

(58) Field of Classification Search .................... 429/50, 429/30, 400; 204/194
See application file for complete search history.

(56) References Cited

U.S. PATENT DOCUMENTS

| 4,203,780 | A  | * | 5/1980  | Matsushita et al. | 438/530  |
|-----------|----|---|---------|-------------------|----------|
| 4,466,380 | A  | * | 8/1984  | Jansen et al.     | 118/712  |
| 6,706,435 | B1 | * | 3/2004  | Biegert et al.    | 429/33   |
| 2003/0064265 | A1 | * | 4/2003 | Hampden-Smith et al. | 429/30 |
| 2005/0274607 | A1 | * | 12/2005 | Kitada et al.    | 204/230.2 |
| 2005/0277007 | A1 | * | 12/2005 | Yoshitake et al. | 429/32   |

FOREIGN PATENT DOCUMENTS

| JP | 06-037479    | 2/1994  |
| JP | 08-275413    | 10/1996 |
| JP | 2003-187812  | 7/2003  |
| WO | 2004/031450 A1 | 4/2004 |

* cited by examiner

*Primary Examiner* — Karie O'Neill Apicella
(74) *Attorney, Agent, or Firm* — Clark Hill PLC

(57) ABSTRACT

The invention provides a hydrogen activating material, which includes as a major constituent an iron-semiconductor alloy containing iron and semiconductor components. It also provides a consumption controlling material for water-soluble electrolyte chemical cells and fuel cells. In addition a hydrogen activating method is also provided.

4 Claims, 7 Drawing Sheets

METHOD FOR IMPROVEMENT OF THE CONSUMPTION CONTROLLING PERFORMANCE OF WATER-SOLUBLE ELECTROLYTE CHEMICAL CELLS AND FUEL CELLS

BACKGROUND OF THE INVENTION

1. Field of the Invention

The present invention relates to a consumption controlling material for water-soluble electrolyte chemical cells capable of improving the consumption controlling performance of the water-soluble electrolyte chemical cells. It further relates to a consumption controlling material for fuel cells capable of improving the consumption controlling performance of the fuel cells.

2. Description of the Related Art

An alloy consisting of iron and silicon, that is, silicon-iron has been widely utilized as a metallic soft magnetic material in various uses such as motor cores and magnetic shields (Patent Document 1: JP-A 8-275413 and Patent Document 2: JP-A 6-37479), and as a deoxidizer in the steel industry. In addition to silicon, there are other various semiconductors such as germanium and selenium, which may be alloyed with iron.

SUMMARY OF THE INVENTION

Alloys containing iron and semiconductor components, such as silicon, have properties that have not yet been elucidated and may be utilized in various uses possibly. The present invention therefore has an object to find out new uses of the iron-semiconductor alloy such as silicon-iron.

To achieve the above object, the inventor found after repetition of eager studies that the iron-semiconductor alloy containing iron and silicon has a property capable of activating hydrogen and improving the reactivity thereof. Thus, the present invention provides a hydrogen activating material, a hydrogen activating agent, or a hydrogen activating composition, including as a major constituent an iron-semiconductor alloy containing iron and semiconductor components.

The inventor also found that the iron-semiconductor alloy containing iron and silicon is capable of improving the consumption controlling performance of water-soluble electrolyte chemical cells such as manganese dry cells, alkaline dry cells, oxiride dry cells, rechargeable nickel-hydrogen cells and nickel dry cells. Thus, the present invention provides a consumption controlling material, consumption controlling agent or consumption controlling composition for water-soluble electrolyte chemical cells, including as a major constituent an iron-semiconductor alloy containing iron and semiconductor to improve the consumption controlling performance of the water-soluble electrolyte chemical cells.

The inventor also found that the iron-semiconductor alloy containing iron and silicon is capable of improving the consumption controlling performance of fuel cells. Thus, the present invention provides a consumption controlling material, consumption controlling agent or consumption controlling composition for fuel cells, including as a major constituent an iron-semiconductor alloy containing iron and semiconductor to improve the consumption controlling performance of the fuel cells.

As described above, in accordance with the present invention, new uses of the iron-semiconductor alloy such as silicon-iron can be found for hydrogen activating and for consumption controlling of the water-soluble electrolyte chemical cells and the fuel cells, or the like.

DETAILED DESCRIPTION OF THE INVENTION

Figure 1:
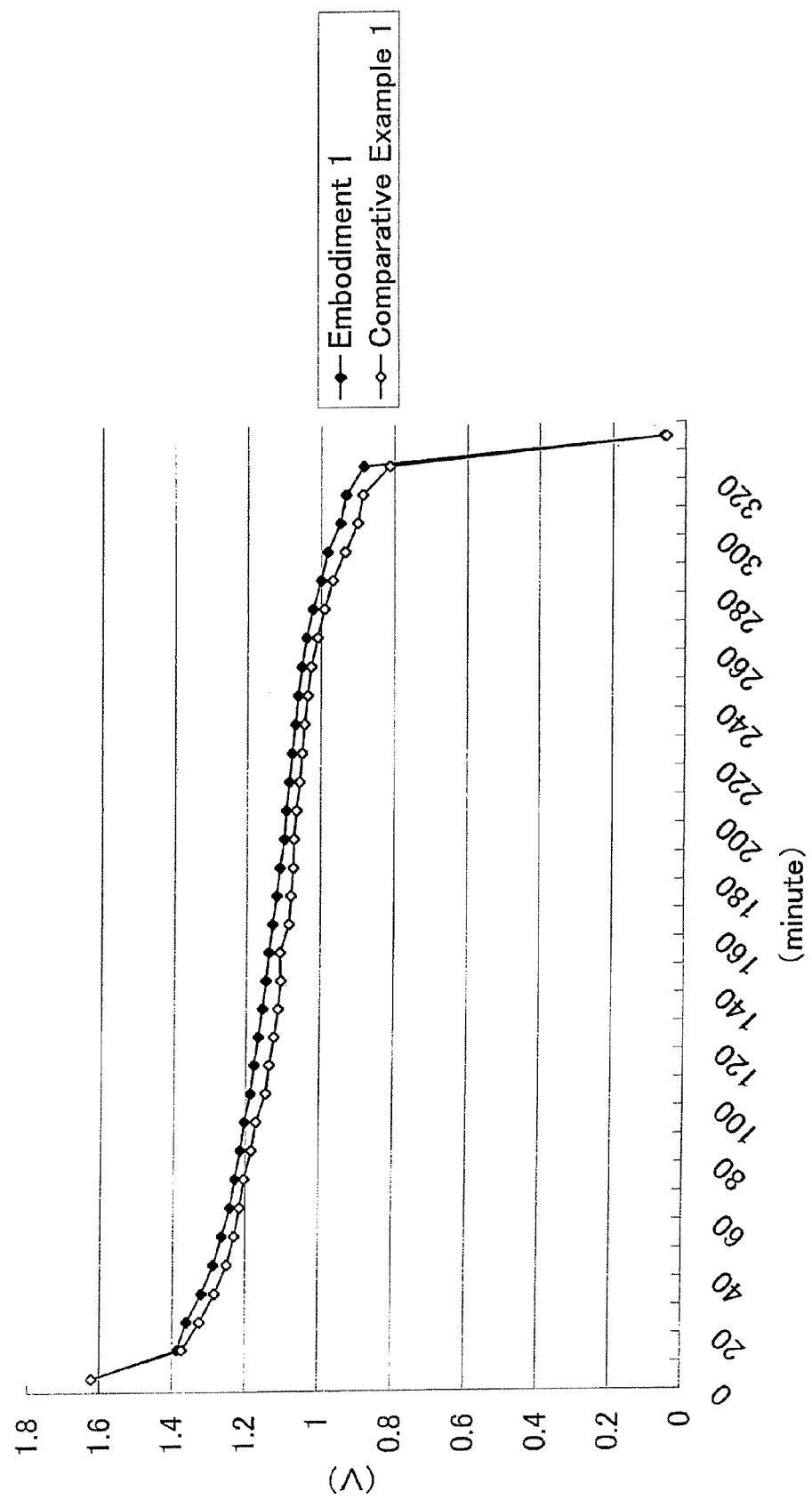
FIG. 1 is a graph illustrating variations with time in voltage with and without a consumption controlling material for water-soluble electrolyte chemical cells according to the present invention located in an alkaline dry cell.

In the hydrogen activating material and the consumption controlling materials for water-soluble electrolyte chemical cells and fuel cells, or the like, according to the present invention, the semiconductor may include: element semiconductors such as silicon (Si), germanium (Ge), tin (Sn), selenium (Se), and tellurium (Te). It may also include a compound semiconductor such as GaAs, GaP, GaSb, AlN, AlP, AlAs, AlSb, InP, InAs, InSb, ZnS, ZnSe, ZnTe, CdS, CdSe, CdTe, AlGaAs, GaInAs, AlInAs, and AlGaInAs. It may further include an oxide semiconductor such as $SnO_2$, ZnO, $Fe_2O_3$, $V_2O_5$, $TiO_2$, NiO, $Cr_2O_3$, $Cu_2O$, $MnO_2$, and MnO. In particular, silicon is preferable. The hydrogen activating material and the consumption controlling materials for water-soluble electrolyte chemical cells and fuel cells, or the like, according to the present invention may contain other components such as nickel (Ni), aluminum (Al), manganese (Mn), carbon (C), chromium (Cr), molybdenum (Mo), tungsten (W), vanadium (V), cobalt (Co), titanium (Ti), titaniumnitride (TiN), zirconium (Zr), niobium (Nb), tantalum (Ta), beryllium (Be), group 11 elements (IB) (gold, silver, copper, unununium), graphite, fluorine compounds, and far infrared radiant material such as ceramics, than iron and semiconductor.

In the present invention, the consumption controlling performance refers to the performance of suppressing cell consumption and efficient discharge suppresses the cell consumption and extends the cell life. In particular, the consumption controlling materials for water-soluble electrolyte chemical cells and fuel cells according to the present invention are characterized in that efficient discharge retains a high voltage and suppresses the cell consumption at the same time.

In the hydrogen activating material and the consumption controlling materials for water-soluble electrolyte chemical cells and fuel cells or the like, according to the present invention, the content of the semiconductor is preferably 1-20 wt. %, and more preferably 1-10 wt. %. In this case, the content of iron is preferably 78-98 wt. %, and more preferably 86-96 wt. %.

That the hydrogen activating material or the like according to the present invention activates nearby hydrogen can be understood from the fact that the rechargeable nickel-hydrogen cell having an improved consumption controlling performance discharges through a solid phase reaction of hydrogen as shown in Formula 1.

$$MH+NiOOH \leftrightarrow M+Ni(OH)_2 \qquad \text{[Formula 1]}$$

In the hydrogen activating material according to the present invention, different types of atoms cause an electrochemical potential across iron and semiconductor crystals. The electrochemical potential exerts a reverse piezoelectric effect on the semiconductor to cause a mechanical strain. Repeated occurrences of such the strain vibrate the semiconductor, which radiates vibrating-electromagnetic waves to external. The semiconductors contained in the iron-semiconductor alloys have various shapes and sizes and cause various electrochemical potentials, radiating vibrating-electromagnetic waves of various frequencies accordingly. Such the electromagnetic waves attack hydrogen atoms having a magnetic moment, exciting hydrogen atoms and activating them. In particular, the electromagnetic waves generated from the hydrogen activating material can be considered to especially attack hydrogen atoms in the vicinity of the material, which performs chemical reactions and contributes to chemical reactions or the like.

Irradiation of electromagnetic waves to the hydrogen activating material according to the present invention causes severe vibrations of the semiconductor, enhancing vibrating-electromagnetic waves, and further activating nearby hydrogen atoms. Thus, the present invention provides an hydrogen activating method, which comprises irradiation of electromagnetic waves to the iron-semiconductor alloy containing iron and semiconductor components to activate hydrogen in the vicinity of the alloy. The present invention also provides a method, which comprises irradiation of electromagnetic waves to the iron-semiconductor alloy containing iron and semiconductor components to improve the consumption controlling performance of water-soluble electrolyte chemical cells and fuel cells. The present invention further provides a hydrogen activating material, including as a major constituent an iron-semiconductor alloy containing iron and semiconductor components, which enhances activation of nearby hydrogen on irradiation of electromagnetic waves thereto. In addition, the present invention provides a consumption controlling material, including as a major constituent an iron-semiconductor alloy containing iron and semiconductor components, which improves the consumption controlling performance of water-soluble electrolyte chemical cells and fuel cells of nearby hydrogen on irradiation of electromagnetic waves thereto. The irradiated electromagnetic waves may include a light (electromagnetic wave) emitted from an incandescent lamp. The light propagates in the vicinity and is transmitted and propagated to clamps such as a bulb socket, bulb reflectors (mirror, plate), and cords. Where mounted on vehicles and so forth, it receives electromagnetic waves from various lights such as headlights, lamps and meters, engines, motors, and batteries, even if the hydrogen activating material or the like is not directly subjected to irradiation. Even where the consumption controlling material is shielded from light, it may receive the influence of electromagnetic waves radiated from bulbs and so forth.

In the hydrogen activating method or the like according to the present invention, the electromagnetic waves irradiated to the alloy include electromagnetic waves with wavelengths of from 1 nm to 1 mm, preferably electromagnetic waves ranging from visible beams to far infrareds with wavelengths of from 380 nm to 1 mm. The electromagnetic waves irradiated include sunlight and white light.

The range of activation of hydrogen influenced from the hydrogen activating material and the consumption controlling materials for water-soluble electrolyte chemical cells and fuel cells according to the present invention depends on the amount of the iron-semiconductor alloy, the temperature condition, the humidity, and the wavelengths, amplitude, waveforms and intensity of the electromagnetic waves irradiated. The hydrogen influenced from the hydrogen activating material and the consumption controlling materials for water-soluble electrolyte chemical cells and fuel cells and so forth according to the present invention may have shapes that are not specially limited but may be formed preferably in the shape of a plate (plates or thin pieces) or a foil.

The iron-semiconductor alloy employed in the present invention can be produced through steel making with addition of a semiconductor such as silicon to the melt of iron. After completion of the steel making, the melt of iron is injected into a mold to form an ingot. The ingot is heated at about 1250° C., and then the properties of the alloy are established to produce a slab. The slab is next heated up to 1000° C. or higher, then gradually thinned to a thickness of several mm through hot rolling under load of about 2 ton/mm in the roll width to produce the iron-semiconductor alloy.

The hydrogen activating material and the consumption controlling materials for water-soluble electrolyte chemical cells and fuel cells according to the present invention are located in the vicinity of respective aimed objects to exert respective functions. Thus, where it is used as the consumption controlling material for water-soluble electrolyte chemical cells, it may be installed in a cell case. Thus, the present invention provides a method for improvement of the consumption controlling performance of water-soluble electrolyte chemical cells and fuel cells, comprising locating an iron-semiconductor alloy containing iron and semiconductor components in the vicinity of the cells.

In the water-soluble electrolyte chemical cells and the consumption controlling materials for water-soluble electrolyte chemical cells and fuel cells according to the present invention, examples of the water-soluble electrolyte include ionic aqueous solutions such as an aqueous solution of potassium hydroxide, an aqueous solution of zinc chloride, an aqueous solution of sodium hydroxide and an aqueous solution of lithium hydroxide, and do not contain any organic solvent or the like. For example, the consumption controlling material according to the present invention can not improve the consumption controlling performance of cells that use an organic solvent system, such as a lithium-manganese dioxide cell.

FIRST EXAMPLE

Examples of the hydrogen activating material according to the present invention are described next. First, as a hydrogen activating material (water-soluble electrolyte consumption controlling material, fuel cell consumption controlling material) according to a first example, a thin plate of silicon-iron (containing 90.5 wt. % or more iron, 3.0 wt. % or less silicon, and others such as 0.5 wt. % or less carbon, 1.5 wt. % or less manganese, 2.0 wt. % or less aluminum, 2.5 wt. % or less nickel and so on) was prepared. The hydrogen activating material (water-soluble electrolyte consumption controlling material, fuel cell consumption controlling material) according to this example was cut out for preparation of 50 mm long x 13 mm wide x 0.05 mm thick samples. A transparent polyester film with a thickness of 0.1 mm was laminated on this piece.

SECOND EXAMPLE

Similarly, as a hydrogen activating material (water-soluble electrolyte consumption controlling material, fuel cell consumption controlling material) according to a second example, a thin plate of silicon-iron (containing 87 wt. % or more iron, 6.5 wt. % or less silicon, and others such as 0.5 wt. % or less carbon, 1.5 wt. % or less manganese, 2.0 wt. % or less aluminum, 2.5 wt. % or less nickel and soon) was prepared. The hydrogen activating material (water-soluble electrolyte consumption controlling material, fuel cell consumption controlling material) according to this example was cut out for preparation of 50 mm long x 13 mm wide x 0.05 mm thick samples.

The hydrogen activating materials (water-soluble electrolyte consumption controlling materials, fuel cell consumption controlling materials) according to the first and second examples were installed on the bottoms of cell cases, on which respective dry cells were located one by one. In an experiment of the consumption controlling performance, the cell case (for one dry cell, item number: UM3X1, available from Morikawa Kogyo Inc.) contains the dry cell (size: 6(IEC)) therein. The cell case was connected via a lead with a length of 480 mm (item No. 10/0.14 A, 1.5ϕ, available from Sanko Denki Inc.) and a bulb socket (item number: ES-T238-C (E10), available from Tozai Denki Sangyo Inc.) to a bulb (FLASHLIGHT BULB, available from Tozai Denki Sangyo Inc.). A voltmeter (Digital Multimeter, R6441A, available from Advantest Inc.) was used to measure variations in voltage.

EXPERIMENT 1 (Alkaline Dry Cell)

An alkaline dry cell (LR6/primary cell, available from Matsushita Kandenchi Kogyo Inc.) was prepared for the experiment. In an embodiment 1, this alkaline dry cell was mounted in a cell case in which the consumption controlling material for water-soluble electrolyte chemical cells according to the first example was installed. In a comparative example 1, the alkaline dry cell was mounted in a cell case in which the consumption controlling material for water-soluble electrolyte chemical cells was not installed. The temperature in the room during measurement was kept at 18-20° C., the relative humidity at 45-49%, and the illumination at 600 luxes (1×). The cell cases of the embodiment 1 and the comparative example 1 were located on an office table at an interval of 1 m to measure voltages every 10 minutes. The results are shown in Table 1 and FIG. 1.

TABLE 1

| | Time (min) | | | | | | |
|---|---|---|---|---|---|---|---|
| | 0 | 10 | 20 | 30 | 40 | 50 | 60 |
| Embodiment 1 | 1.623 | 1.386 | 1.359 | 1.319 | 1.288 | 1.266 | 1.243 |
| Comparative Example 1 | 1.623 | 1.372 | 1.324 | 1.284 | 1.251 | 1.231 | 1.216 |

TABLE 1-continued

| | Time (min) | | | | | | |
|---|---|---|---|---|---|---|---|
| | 70 | 80 | 90 | 100 | 110 | 120 | 130 |
| Embodiment 1 | 1.230 | 1.215 | 1.204 | 1.188 | 1.178 | 1.167 | 1.156 |
| Comparative Example 1 | 1.204 | 1.184 | 1.172 | 1.146 | 1.137 | 1.125 | 1.114 |

| | Time (min) | | | | | | |
|---|---|---|---|---|---|---|---|
| | 140 | 150 | 160 | 170 | 180 | 190 | 200 |
| Embodiment 1 | 1.147 | 1.139 | 1.130 | 1.119 | 1.111 | 1.099 | 1.094 |
| Comparative Example 1 | 1.107 | 1.097 | 1.086 | 1.080 | 1.074 | 1.073 | 1.066 |

| | Time (min) | | | | | | |
|---|---|---|---|---|---|---|---|
| | 210 | 220 | 230 | 240 | 250 | 260 | 270 |
| Embodiment 1 | 1.086 | 1.078 | 1.069 | 1.062 | 1.052 | 1.040 | 1.023 |
| Comparative Example 1 | 1.058 | 1.051 | 1.045 | 1.036 | 1.027 | 1.010 | 0.991 |

| | Time (min) | | | | | |
|---|---|---|---|---|---|---|
| | 280 | 290 | 300 | 310 | 320 | 330 |
| Embodiment 1 | 1.001 | 0.983 | 0.948 | 0.933 | 0.885 | 0.058 |
| Comparative Example 1 | 0.969 | 0.935 | 0.902 | 0.888 | 0.813 | 0.052 |

(V)

As obvious from Table 1 and FIG. 1, it is more effective at suppressing discharge from the cell in the embodiment 1 provided with the consumption controlling material according to the first example than in the comparative example 1.

EXPERIMENT 2 (Oxiride Dry Cell)

An oxiride dry cell (ZR6 (Y)/primary cell, available from Matsushita Kandenchi Kogyo Inc.) was prepared for the experiment. In an embodiment 2, this oxiride dry cell was mounted in a cell case in which the consumption controlling material for water-soluble electrolyte chemical cells according to the second example was installed. In a comparative example 2, the oxiride dry cell was mounted in a cell case in which the consumption controlling material for water-soluble electrolyte chemical cells was not installed. The temperature in the room during measurement was kept at 18-20° C., the relative humidity at 45-49%, and the illumination at 600 luxes (1×). The cell cases of the embodiment 2 and the comparative example 2 were located on an office table at an interval of 1 m to measure voltages every 10 minutes. The results are shown in Table 2 and FIG. 2.

TABLE 2

| | Time (min) | | | | | | |
|---|---|---|---|---|---|---|---|
| | 0 | 10 | 20 | 30 | 40 | 50 | 60 |
| Embodiment 2 | 1.729 | 1.561 | 1.537 | 1.510 | 1.485 | 1.469 | 1.454 |
| Comparative Example 2 | 1.729 | 1.541 | 1.518 | 1.491 | 1.471 | 1.454 | 1.435 |

| | Time (min) | | | | | | |
|---|---|---|---|---|---|---|---|
| | 70 | 80 | 90 | 100 | 110 | 120 | 130 |
| Embodiment 2 | 1.439 | 1.416 | 1.397 | 1.380 | 1.359 | 1.340 | 1.316 |
| Comparative Example 2 | 1.416 | 1.389 | 1.374 | 1.356 | 1.331 | 1.313 | 1.286 |

TABLE 2-continued

| | _____ Time (min) _____ | | | | | | |
|---|---|---|---|---|---|---|---|
| | 140 | 150 | 160 | 170 | 180 | 190 | 200 |
| Embodiment 2 | 1.296 | 1.273 | 1.254 | 1.226 | 1.201 | 1.175 | 1.150 |
| Comparative Example 2 | 1.267 | 1.242 | 1.217 | 1.187 | 1.154 | 1.128 | 1.092 |

| | _____ Time (min) _____ | | | | | | |
|---|---|---|---|---|---|---|---|
| | 210 | 220 | 230 | 240 | 250 | 260 | 270 |
| Embodiment 2 | 1.123 | 1.100 | 1.079 | 1.048 | 1.008 | 1.015 | 1.014 |
| Comparative Example 2 | 1.055 | 1.013 | 0.916 | 0.113 | 0.106 | 0.099 | 0.992 |

| | _____ Time (min) _____ | | | | | | | |
|---|---|---|---|---|---|---|---|---|
| | 280 | 290 | 300 | 310 | 320 | 330 | 340 | 350 |
| Embodiment 2 | 1.034 | 1.022 | 0.995 | 0.963 | 0.869 | 0.882 | 0.862 | 0.045 |
| Comparative Example 2 | 0.085 | 0.079 | 0.074 | 0.069 | 0.066 | 0.063 | 0.060 | 0.057 |

(V)

Figure 2:
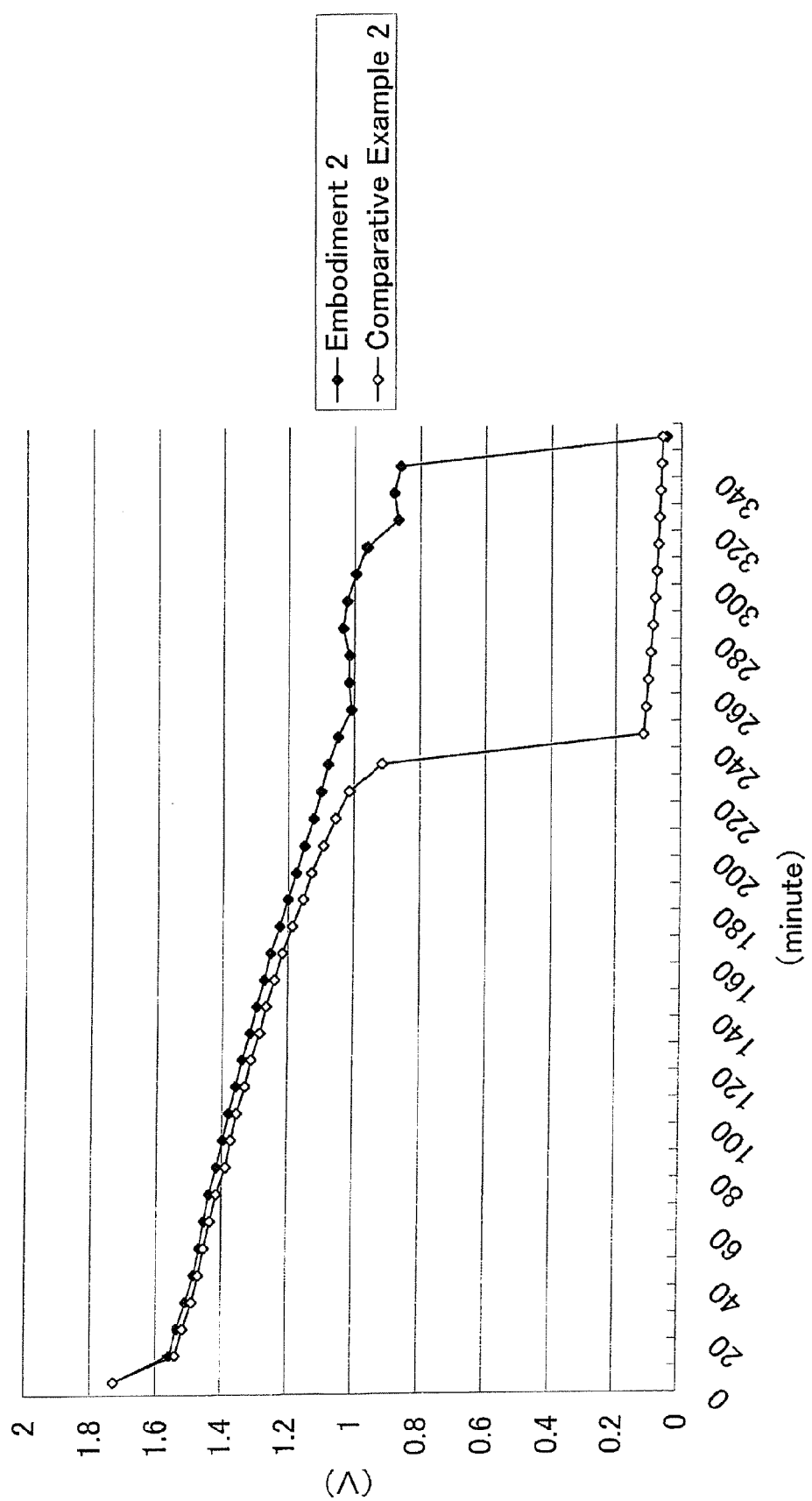
FIG. 2 is a graph illustrating variations with time in voltage with and without a consumption controlling material for water-soluble electrolyte chemical cells according to the present invention located in an oxiride dry cell.

As obvious from Table 2 and FIG. 2, it is more effective at suppressing discharge from the cell in the embodiment 2 provided with the consumption controlling material according to the second example than in the comparative example 2.

EXPERIMENT 3 (Rechargeable Nickel-Hydrogen Cell)

A nickel-hydrogen cell (Ni-MH AA/1.2V, secondary cell, available from Sony Inc.) was prepared for the experiment. In an embodiment 3, this nickel-hydrogen cell was mounted in a cell case in which the consumption controlling material for water-soluble electrolyte chemical cells according to the first example was installed. In a comparative example 3, the nickel-hydrogen cell was mounted in a cell case in which the consumption controlling material for water-soluble electrolyte chemical cells was not installed. The temperature in the room during measurement was kept at 18-20° C., the relative humidity at 45-49%, and the illumination at 600 luxes (1×). The cell cases of the embodiment 3 and the comparative example 3 were located on an office table at an interval of 1 m to measure voltages every 10 minutes. The results are shown in Table 3 and FIG. 3.

TABLE 3

| | _____ Time (min) _____ | | | | | | |
|---|---|---|---|---|---|---|---|
| | 0 | 10 | 20 | 30 | 40 | 50 | 60 |
| Embodiment 3 | 1.433 | 1.334 | 1.312 | 1.296 | 1.283 | 1.266 | 1.261 |
| Comparative Example 3 | 1.433 | 1.304 | 1.278 | 1.261 | 1.246 | 1.237 | 1.231 |

| | _____ Time (min) _____ | | | | | | |
|---|---|---|---|---|---|---|---|
| | 70 | 80 | 90 | 100 | 110 | 120 | 130 |
| Embodiment 3 | 1.251 | 1.248 | 1.244 | 1.242 | 1.240 | 1.237 | 1.234 |
| Comparative Example 3 | 1.224 | 1.219 | 1.216 | 1.214 | 1.213 | 1.211 | 1.209 |

| | _____ Time (min) _____ | | | | | | |
|---|---|---|---|---|---|---|---|
| | 140 | 150 | 160 | 170 | 180 | 190 | 200 |
| Embodiment 3 | 1.230 | 1.227 | 1.225 | 1.226 | 1.225 | 1.226 | 1.226 |
| Comparative Example 3 | 1.205 | 1.204 | 1.203 | 1.203 | 1.202 | 1.202 | 1.204 |

TABLE 3-continued

| | _____ Time (min) _____ | | | | | | |
|---|---|---|---|---|---|---|---|
| | 210 | 220 | 230 | 240 | 250 | 260 | 270 |
| Embodiment 3 | 1.225 | 1.225 | 1.222 | 1.220 | 1.218 | 1.216 | 1.213 |
| Comparative Example 3 | 1.205 | 1.203 | 1.198 | 1.196 | 1.193 | 1.191 | 1.189 |

| | _____ Time (min) _____ | | | | | | |
|---|---|---|---|---|---|---|---|
| | 280 | 290 | 300 | 310 | 320 | 330 | 340 |
| Embodiment 3 | 1.211 | 1.203 | 1.199 | 1.191 | 1.174 | 1.169 | 1.159 |
| Comparative Example 3 | 1.187 | 1.180 | 1.173 | 1.163 | 1.153 | 1.149 | 1.139 |

| | _____ Time (min) _____ | | | | | | |
|---|---|---|---|---|---|---|---|
| | 350 | 360 | 370 | 380 | 390 | 400 | 410 |
| Embodiment 3 | 1.152 | 1.147 | 1.141 | 1.135 | 1.129 | 1.118 | 1.100 |
| Comparative Example 3 | 1.131 | 1.125 | 1.119 | 1.111 | 1.099 | 1.083 | 1.059 |

| | _____ Time (min) _____ | | | |
|---|---|---|---|---|
| | 420 | 430 | 440 | 450 |
| Embodiment 3 | 1.069 | 1.007 | 0.263 | 0.062 |
| Comparative Example 3 | 0.963 | 0.117 | 0.053 | 0.031 |

(V)

Figure 3:
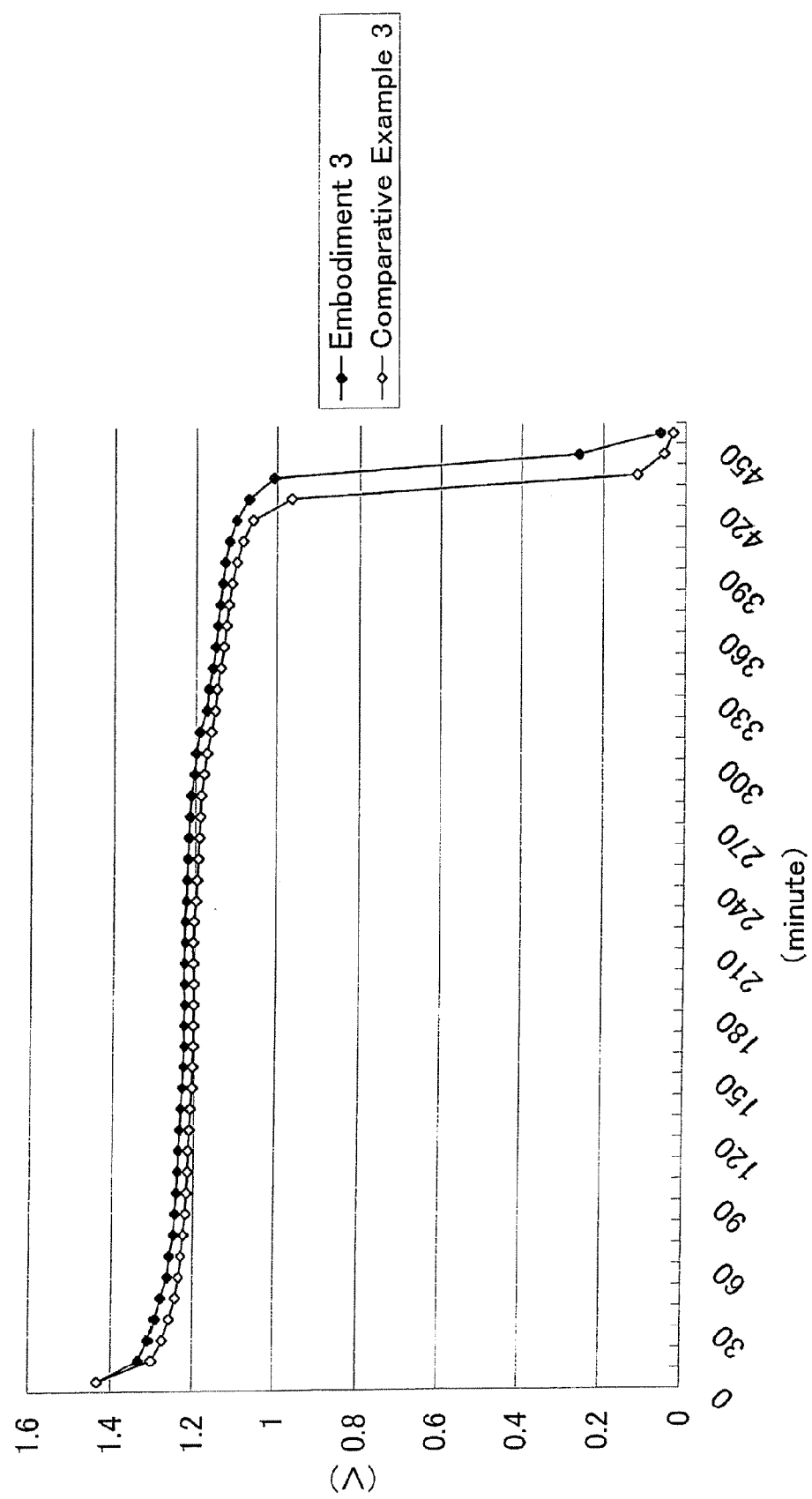
FIG. 3 is a graph illustrating variations with time in voltage with and without a consumption controlling material for water-soluble electrolyte chemical cells according to the present invention located in a nickel-hydrogen cell.

As obvious from Table 3 and FIG. 3, it is more effective at suppressing discharge from the cell in the embodiment 3 provided with the consumption controlling material according to the first example than in the comparative example 3.

EXPERIMENT 4 (Manganese Dry Cell)

A manganese dry cell (R6/primary cell, available from Toshiba Denchi Inc.) was prepared for the experiment. In an embodiment 4, this manganese dry cell was mounted in a cell case in which the consumption controlling material for water-soluble electrolyte chemical cells according to the second example was installed. In a comparative example 4, the manganese dry cell was mounted in a cell case in which the consumption controlling material for water-soluble electrolyte chemical cells was not installed. In the embodiment 4, a transparent tape (40 mm long×15 mm wide) was used to additionally attach the consumption controlling material for water-soluble electrolyte chemical cells according to the second example onto the dry cell. In the experiment 4, a sample was prepared as an embodiment 5 by irradiating the sample according to the embodiment 4 with incandescence for a spot light (item number: OE855450, available from ODELIC Co., Ltd) of 15,000 luxes (1×) from 500 mm distant position. These embodiments 4 and 5 and the comparative example 4 were experimented. The temperature in the room during measurement was kept at 18-20° C., the relative humidity at 45-49%, and the illumination at 600 luxes (1×). The cell cases of the embodiments 4 and 5 were located on an office table at intervals of 3 m, and the cell cases of the comparative example 4 was located at intervals of 3 m from the embodiment 5 to measure voltages every 10 minutes. The results are shown in Table 4 and FIG. 4.

TABLE 4

| | Time (min) | | | | | |
|---|---|---|---|---|---|---|
| | 0 | 10 | 20 | 30 | 40 | 50 |
| Embodiment 4 | 1.656 | 1.274 | 1.200 | 1.162 | 1.130 | 1.095 |
| Embodiment 5 | 1.656 | 1.295 | 1.248 | 1.220 | 1.190 | 1.167 |
| Comparative Example 4 | 1.656 | 1.235 | 1.160 | 1.122 | 1.085 | 1.040 |

| | Time (min) | | | | | |
|---|---|---|---|---|---|---|
| | 60 | 70 | 80 | 90 | 100 | 110 |
| Embodiment 4 | 1.059 | 1.018 | 0.976 | 0.931 | 0.884 | 0.842 |
| Embodiment 5 | 1.143 | 1.111 | 1.080 | 1.045 | 1.005 | 0.959 |
| Comparative Example 4 | 0.998 | 0.950 | 0.908 | 0.853 | 0.790 | 0.730 |

| | Time (min) | | | | | |
|---|---|---|---|---|---|---|
| | 120 | 130 | 140 | 150 | 160 | 170 |
| Embodiment 4 | 0.762 | 0.681 | 0.578 | 0.450 | 0.329 | 0.208 |
| Embodiment 5 | 0.908 | 0.851 | 0.790 | 0.715 | 0.624 | 0.516 |
| Comparative Example 4 | 0.723 | 0.504 | 0.335 | 0.187 | 0.113 | 0.081 |

| | Time (min) | | | | | |
|---|---|---|---|---|---|---|
| | 180 | 190 | 200 | 210 | 220 | 230 |
| Embodiment 4 | 0.192 | 0.142 | 0.122 | 0.133 | 0.141 | 0.053 |
| Embodiment 5 | 0.387 | 0.245 | 0.150 | 0.099 | 0.073 | 0.059 |
| Comparative Example 4 | 0.065 | 0.054 | 0.048 | 0.048 | 0.041 | 0.039 |

(V)

Figure 4:
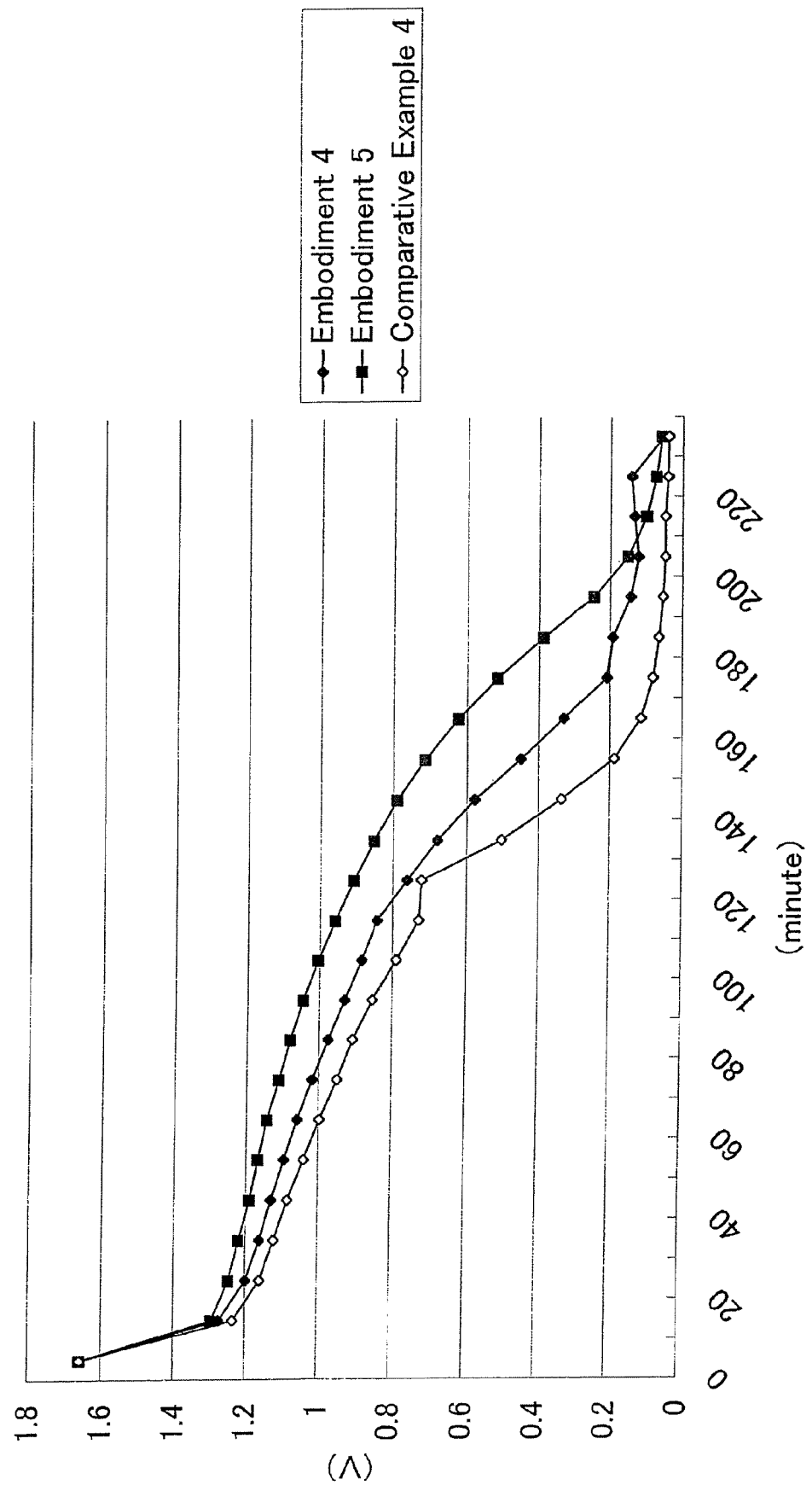
FIG. 4 is a graph illustrating variations with time in voltage with and without a consumption controlling material for water-soluble electrolyte chemical cells according to the present invention located in a manganese dry cell.

As obvious from Table 4 and FIG. 4, it is more effective at suppressing discharge from the cell in the embodiments 4 and 5 provided with the consumption controlling material according to the second example than in the comparative example 4. As can been seen, it is more effective at suppressing discharge from the cell in the incandescence-applied embodiment 5 than in the embodiment 4.

EXPERIMENT 5 (Nickel Dry Cell)

A nickel dry cell (ZR6H 4BP/primary cell, available from Toshiba Denchi Inc.) was prepared for the experiment. In an embodiment 6, this nickel dry cell was mounted in a cell case in which the consumption controlling material for water-soluble electrolyte chemical cells according to the first example was installed. In a comparative example 5, the nickel dry cell was mounted in a cell case in which the consumption controlling material for water-soluble electrolyte chemical cells was not installed. The temperature in the room during measurement was kept at 18-20° C., the relative humidity at 45-49%, and the illumination at 600 luxes (1×). The cell cases of the embodiment 6 and the comparative example 5 were located on an office table at an interval of 1 m to measure voltages every 10 minutes. The results are shown in Table 5 and FIG. 5.

TABLE 5

| | Time (min) | | | | | | |
|---|---|---|---|---|---|---|---|
| | 0 | 10 | 20 | 30 | 40 | 50 | 60 |
| Embodiment 6 | 1.730 | 1.560 | 1.520 | 1.504 | 1.495 | 1.484 | 1.472 |
| Comparative Example 5 | 1.730 | 1.515 | 1.497 | 1.473 | 1.460 | 1.448 | 1.438 |

TABLE 5-continued

| | Time (min) | | | | | | |
|---|---|---|---|---|---|---|---|
| | 70 | 80 | 90 | 100 | 110 | 120 | 130 |
| Embodiment 6 | 1.452 | 1.439 | 1.430 | 1.421 | 1.413 | 1.405 | 1.399 |
| Comparative Example 5 | 1.424 | 1.412 | 1.401 | 1.390 | 1.378 | 1.368 | 1.359 |

| | Time (min) | | | | | | |
|---|---|---|---|---|---|---|---|
| | 140 | 150 | 160 | 170 | 180 | 190 | 200 |
| Embodiment 6 | 1.383 | 1.375 | 1.362 | 1.355 | 1.346 | 1.324 | 1.310 |
| Comparative Example 5 | 1.350 | 1.353 | 1.343 | 1.332 | 1.311 | 1.293 | 1.282 |

| | Time (min) | | | | | |
|---|---|---|---|---|---|---|
| | 210 | 220 | 230 | 240 | 250 | 260 |
| Embodiment 6 | 1.290 | 1.274 | 1.259 | 1.218 | 1.160 | 0.036 |
| Comparative Example 5 | 1.267 | 1.253 | 1.235 | 1.207 | 1.144 | 0.042 |

(V)

Figure 5:
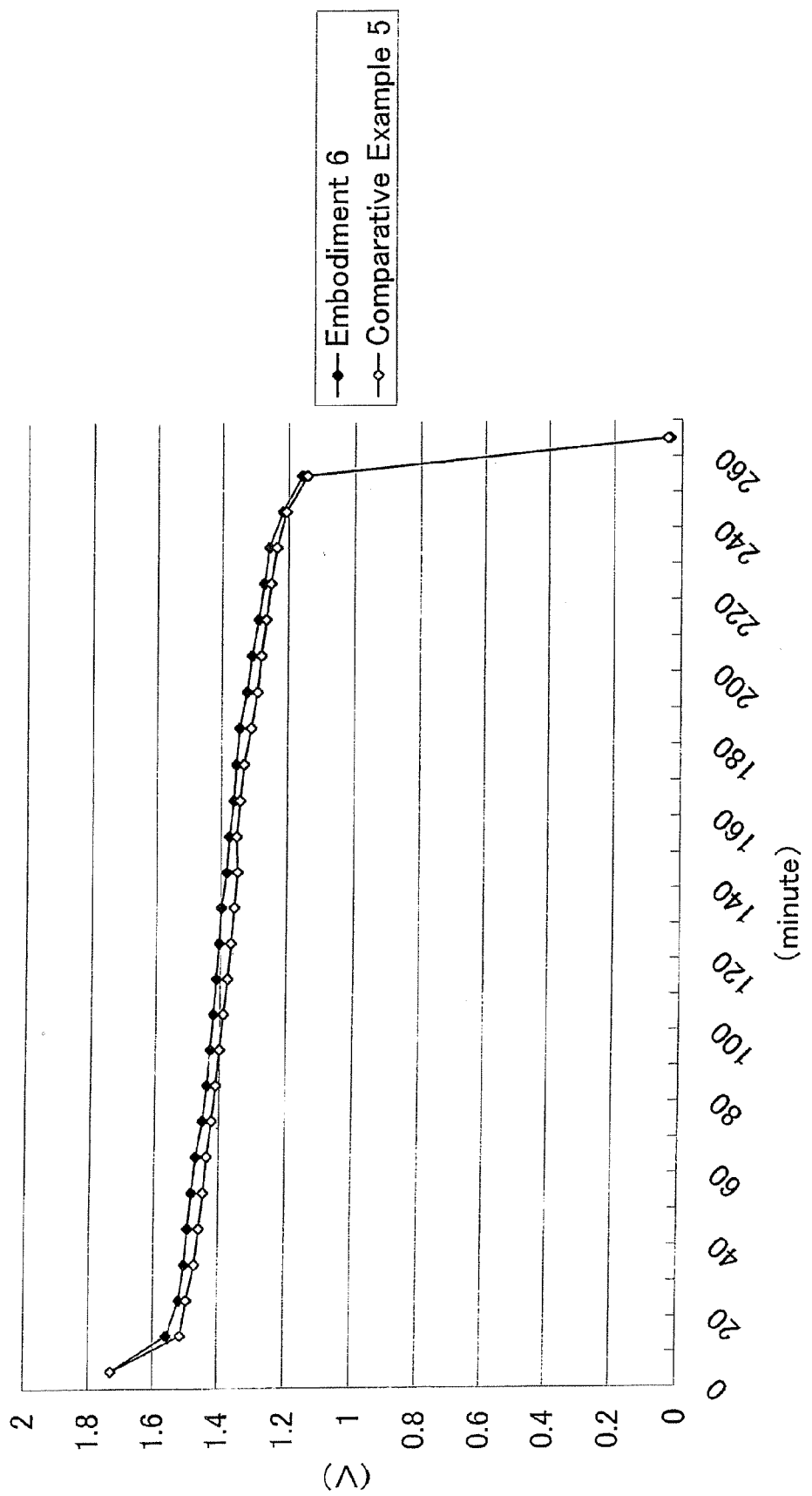
FIG. 5 is a graph illustrating variations with time in voltage with and without a consumption controlling material for water-soluble electrolyte chemical cells according to the present invention located in a nickel dry cell.

As obvious from Table 5 and FIG. 5, it is more effective at suppressing discharge from the cell in the embodiment 6 provided with the consumption controlling material according to the first example than in the comparative example 5.

THIRD EXAMPLE

Next, as a hydrogen activating material (water-soluble electrolyte consumption controlling material, fuel cell consumption controlling material) according to a third example, a thin plate of silicon-iron (containing 90.5 wt. % or more iron, 3.0 wt. % or less silicon, and others such as 0.5 wt. % or less carbon, 1.5 wt. % or less manganese, 2.0 wt. % or less aluminum, 2.5 wt. % or less nickel and so on) was prepared. The hydrogen activating material (water-soluble electrolyte consumption controlling material, fuel cell consumption controlling material) according to this example was cut out for preparation of 25 mm long x 20 mm wide×0.05 mm thick samples. A transparent polyester film with a thickness of 0.1 mm was laminated on the pieces to prepare two laminated pieces.

EXPERIMENT 6 (Fuel Cell)

The consumption controlling was experimented with respect to a fuel cell. First, a fuel cell (small fuel cell PFC-ED3, available from Daido Metal Kogyo Inc.) was prepared and two pieces of the consumption controlling material for fuel cells according to the third example were arranged on positions 10 mm distant from both sides of the cell. An output cord (100 mm long) from the fuel cell was connected to a motor (DC 0.5V/0.05 W, available from Dai do Metal Kogyo Inc.). Then, variations in voltage were measured every 60 seconds while any load such as a propeller was not imposed on the shaft of the motor and only the shaft was rotated. In this case, as there was the sharp variation during 180-240 seconds, the measurement was performed at finer time intervals.

Electric energy was generated by the hydrogen fuel subjected to reaction with oxygen extracted from the air after a hydrogen gas was supplied from a hydrogen gas can (MAX 0.3 MPa, available from Iwatani Gas Inc.) with the fuel cell. In an embodiment 7, two pieces of the consumption controlling material for fuel cells according to the third example were arranged. In an embodiment 8, the entire of the embodiment 7 was covered with a black vinyl sheet and shielded from light. In a comparative example 6, the consumption controlling material for fuel cells according to the third example was not arranged. The temperature in the room during measurement was kept at 18-20° C., the relative humidity at 45-49%, and the illumination at 600 luxes (1×). These measurement results are shown in Table 6 and FIG. 6.

TABLE 6

|  | Time (sec) | | | | |
| --- | --- | --- | --- | --- | --- |
|  | 0 | 60 | 120 | 180 | 195 |
| Embodiment 7 | 0.670 | 0.661 | 0.658 | 0.645 | 0.623 |
| Embodiment 8 | 0.670 | 0.660 | 0.655 | 0.637 | 0.486 |
| Comparative Example 6 | 0.670 | 0.657 | 0.652 | 0.614 | 0.034 |

|  | Time (sec) | | | | |
| --- | --- | --- | --- | --- | --- |
|  | 200 | 210 | 220 | 240 | 300 |
| Embodiment 7 | 0.410 | 0.033 | 0.019 | 0.0104 | 0.0057 |
| Embodiment 8 | 0.150 | 0.020 | 0.017 | 0.0120 | 0.0063 |
| Comparative Example 6 | 0.027 | 0.018 | 0.016 | 0.0120 | 0.0070 |

(V)

Figure 6:
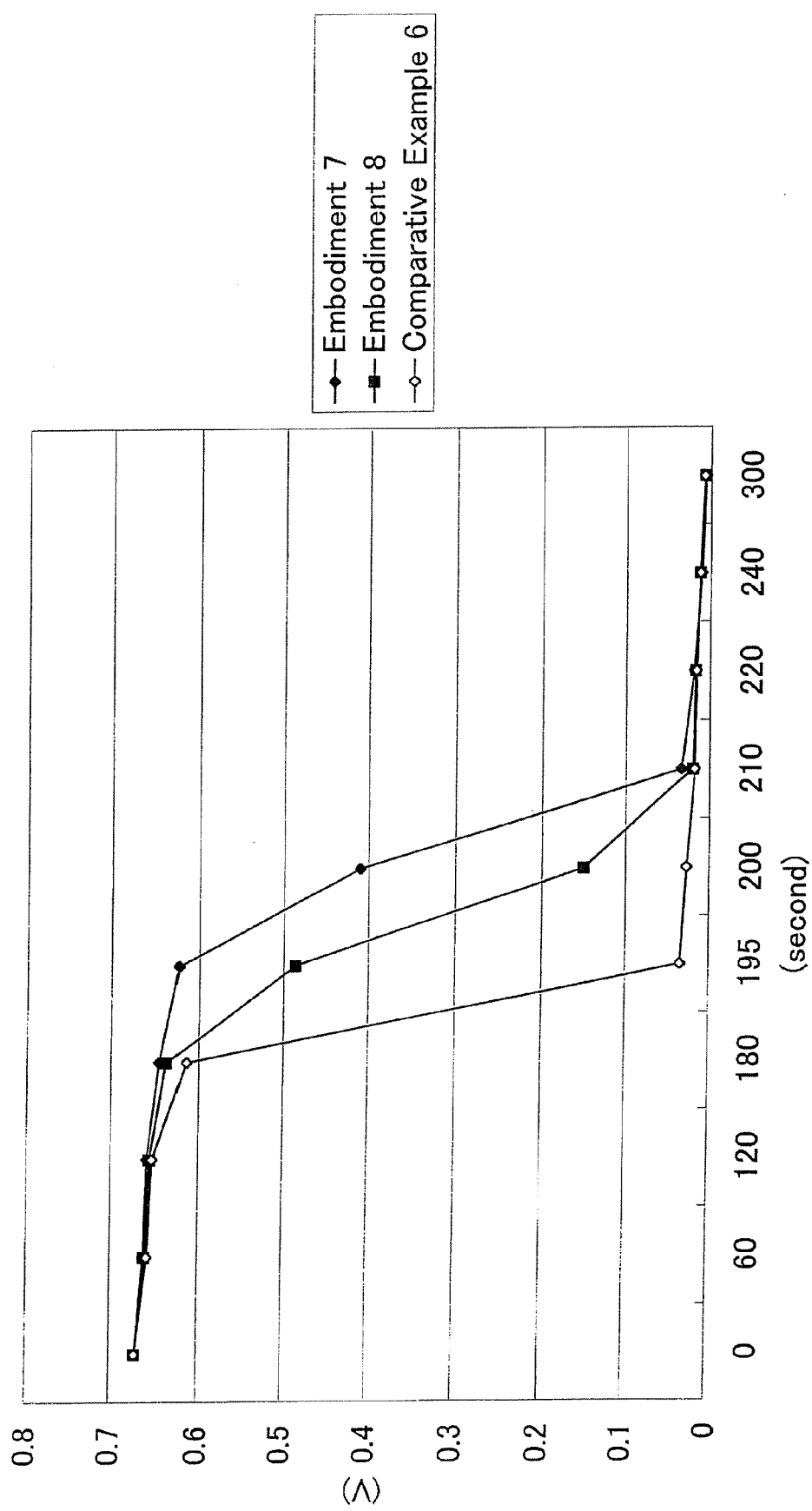
FIG. 6 is a graph illustrating variations with time in voltage with and without a consumption controlling material for fuel cells according to the present invention located in a fuel cell.

As obvious from Table 6 and FIG. 6, it is more effective at suppressing discharge from the cell in the embodiments 7 and 8 provided with the consumption controlling material according to the third example than in the comparative example 6. As can been seen, it is more effective at suppressing discharge from the cell in the embodiment 7 not shield from light and irradiated with light than in the embodiment 8 shield from light and not irradiated with light.

COMPARATIVE EXPERIMENT
(Lithium-Manganese Dioxide Cell)

Figure 7:
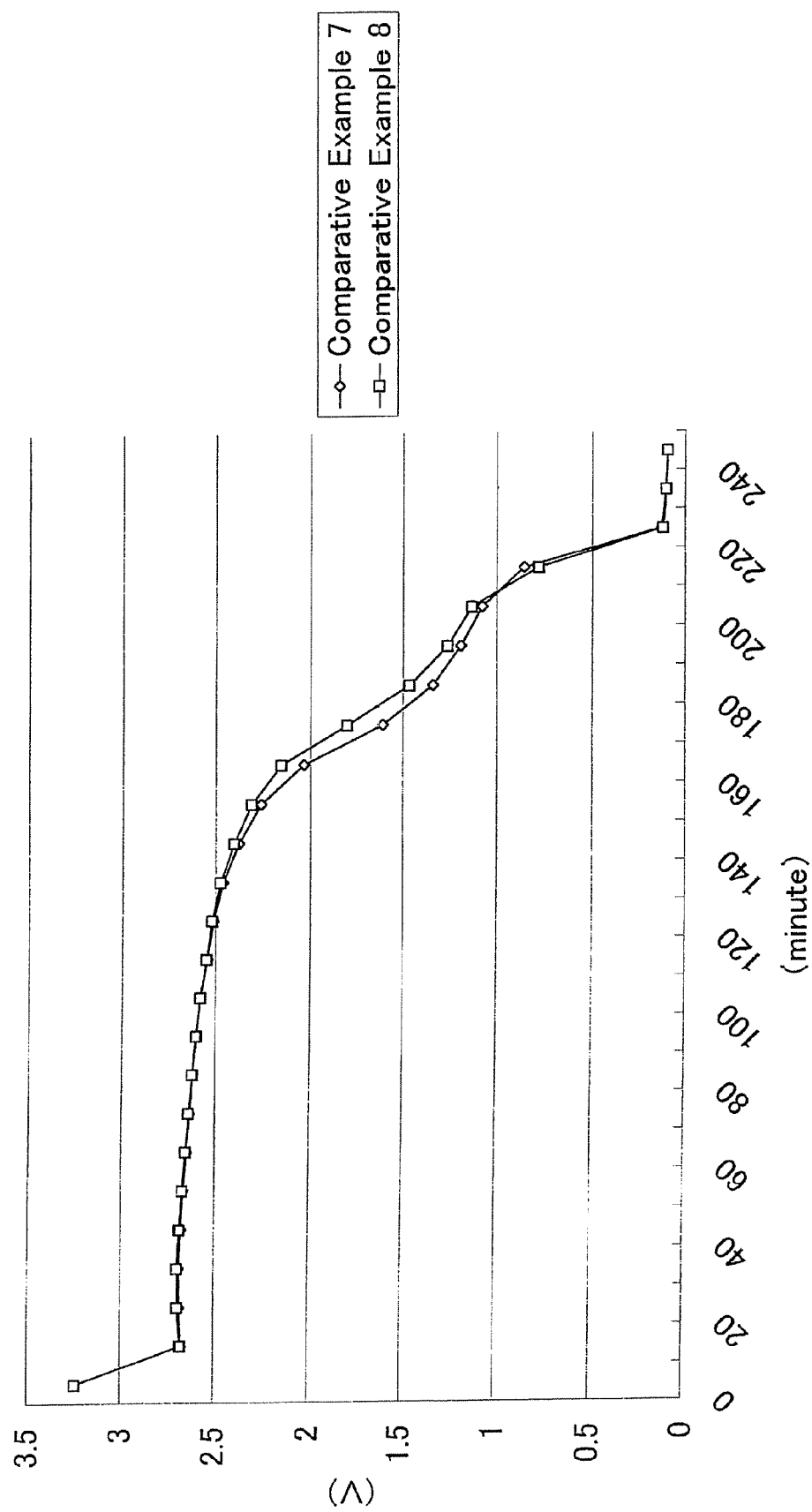
FIG. 7 is a graph illustrating variations with time in voltage with and without a consumption controlling material for water-soluble electrolyte chemical cells according to the present invention located in a lithium-manganese dioxide cell.

A lithium-manganese dioxide cell (CR2/primary cell, available from Toshiba Denchi Inc.) was prepared for the experiment. In a comparative example 7, this lithium-manganese dioxide cell was mounted in a cell case (item number: UM5×2, available from Ishikawa Seisakusho Inc.) in which the consumption controlling material for water-soluble electrolyte chemical cells according to the first example, processed in 25 mm long×10 mm wide × 0.05 mm thick, was installed. In a comparative example 8, the lithium-manganese dioxide cell was mounted in a cell case in which the consumption controlling material for water-soluble electrolyte chemical cells was not installed. The temperature in the room during measurement was kept at 18-20° C., the relative humidity at 45-49%, and the illumination at 600 luxes (1×). The cell cases of the comparative examples 7 and 8 were located on an office table at an interval of 1 m to measure voltages every 10 minutes. The results are shown in Table 7 and FIG. 7.

TABLE 7

|  | Time (min) | | | | |
| --- | --- | --- | --- | --- | --- |
|  | 0 | 10 | 20 | 30 | 40 |
| Comparative Example 7 | 3.243 | 2.675 | 2.683 | 2.687 | 2.677 |
| Comparative Example 8 | 3.243 | 2.677 | 2.692 | 2.695 | 2.684 |

TABLE 7-continued

|  | Time (min) | | | | |
| --- | --- | --- | --- | --- | --- |
|  | 50 | 60 | 70 | 80 | 90 |
| Comparative Example 7 | 2.665 | 2.650 | 2.635 | 2.620 | 2.601 |
| Comparative Example 8 | 2.670 | 2.655 | 2.639 | 2.621 | 2.601 |

|  | Time (min) | | | | |
| --- | --- | --- | --- | --- | --- |
|  | 100 | 110 | 120 | 130 | 140 |
| Comparative Example 7 | 2.582 | 2.544 | 2.513 | 2.463 | 2.378 |
| Comparative Example 8 | 2.579 | 2.548 | 2.519 | 2.476 | 2.403 |

|  | Time (min) | | | | |
| --- | --- | --- | --- | --- | --- |
|  | 150 | 160 | 170 | 180 | 190 |
| Comparative Example 7 | 2.261 | 2.035 | 1.610 | 1.341 | 1.190 |
| Comparative Example 8 | 2.311 | 2.154 | 1.803 | 1.465 | 1.260 |

|  | Time (min) | | | | |
| --- | --- | --- | --- | --- | --- |
|  | 200 | 210 | 220 | 230 | 240 |
| Comparative Example 7 | 1.076 | 0.853 | 0.124 | 0.105 | 0.096 |
| Comparative Example 8 | 1.130 | 0.776 | 0.118 | 0.102 | 0.094 |

(V)

The electrolyte in the lithium-manganese dioxide cell is not water-soluble and uses an organic solvent. Accordingly, the effect of the consumption controlling material according to the first example can not be exerted, as obvious from Table 7 and FIG. 7.

What is claimed is:

1. A method of retaining a high voltage of water-soluble electrolyte chemical cells with regard to an iron-semiconductor alloy in the shape of a plate produced by addition of a semiconductor to molten iron during steel making and rolling under load, comprising locating the iron-semiconductor alloy in the vicinity of the water-soluble electrolyte chemical cells, then severely vibrating the semiconductor by irradiating the iron-semiconductor alloy, from which vibrating-electromagnetic waves are generated on the basis of electrochemical potentials across iron and semiconductor crystals, with sunlight or white light with wavelengths of from 1 nm to 1 mm, thereby enhancing vibrating-electromagnetic waves further generated from the alloy and retaining a high voltage of water-soluble electrolyte chemical cells in the vicinity of the alloy, wherein the content of the semiconductor is 1-10 weight percent and the content of iron is 78-98 weight percent.

2. The method according to claim 1, wherein said semiconductor is silicon.

3. A method of retaining a high voltage of fuel cells with regard to an iron-semiconductor alloy in the shape of a plate produced by addition of a semiconductor to molten iron during steel making and rolling under load, comprising locating the iron-semiconductor alloy in the vicinity of the fuel cells, then severely vibrating the semiconductor by irradiating the iron-semiconductor alloy, from which vibrating-electromagnetic waves are generated on the basis of electrochemical potentials across iron and semiconductor crystals, with sunlight or white light with wavelengths of from 1 nm to 1 mm, thereby enhancing vibrating-electromagnetic waves further generated from the alloy and retaining a high voltage of fuel cells in the vicinity of the alloy, wherein the content of the semiconductor is 1-10 weight percent and the content of iron is 78-98 weight percent.

4. The method according to claim 3, wherein said semiconductor is silicon.

* * * * *